United States Patent
Sanagavarapu et al.

(10) Patent No.: US 11,966,904 B1
(45) Date of Patent: Apr. 23, 2024

(54) MOBILE AS A BANKING GATEWAY FOR SMART APPLIANCES WITH FUTURE NETWORKS

(71) Applicant: Wells Fargo Bank, N.A., San Francisco, CA (US)

(72) Inventors: Lalit Mohan Sanagavarapu, San Francisco, CA (US); Kamal Gaur, San Francisco, CA (US); Kunal Chaubey, San Franciso, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 184 days.

(21) Appl. No.: 17/722,496

(22) Filed: Apr. 18, 2022

(51) Int. Cl.
- *G06F 8/65* (2018.01)
- *G06F 8/654* (2018.01)
- *G06F 8/71* (2018.01)
- *G06Q 20/30* (2012.01)
- *G06Q 20/40* (2012.01)

(52) U.S. Cl.
CPC ............. *G06Q 20/308* (2020.05); *G06F 8/65* (2013.01); *G06F 8/654* (2018.02); *G06F 8/71* (2013.01); *G06Q 20/4015* (2020.05)

(58) Field of Classification Search
None
See application file for complete search history.

(56) References Cited

U.S. PATENT DOCUMENTS

| | | | |
|---|---|---|---|
| 9,134,994 B2 * | 9/2015 | Patel | G06Q 20/28 |
| 10,484,477 B2 * | 11/2019 | Nasir | H04L 67/125 |
| 10,827,092 B1 | 11/2020 | Bier et al. | |
| 11,100,490 B1 | 8/2021 | Doyle et al. | |
| 11,301,240 B2 * | 4/2022 | Rouland | H04L 67/34 |
| 2019/0026716 A1 | 1/2019 | Anbukkarasu et al. | |
| 2019/0208024 A1 * | 7/2019 | Jablonski | G06Q 20/308 |
| 2020/0333151 A1 | 10/2020 | Akhtar | |
| 2021/0158428 A1 | 5/2021 | Sandre et al. | |
| 2021/0359897 A1 * | 11/2021 | Shaked | H04L 12/281 |

OTHER PUBLICATIONS

Ali Faeq Mohanad et al., "A Novel Session Payment System via Internet of Things (IOT)," https://www.ripublication.com/ijaer17/ijaerv12n23_59.pdf, 1-7 pages.

Smith Jason, "Wearable Payment Devices: How IoT Payment Gateways Are Changing eCommerce," (Feb. 27, 2018), https://www.dotcms.com/blog/post/wearable-payment-devices-how-iot-payment-gateways-are-changing-ecommerce, pp. 1-5 pages.

* cited by examiner

Primary Examiner — Marina Lee
(74) Attorney, Agent, or Firm — Foley & Lardner LLP

(57) ABSTRACT

A computer system includes one or more processors and machine readable storage media coupled to the one or more processors having instructions stored therein that cause the computer system to: receive a payment request packet from an Internet of Things (IoT) device; extract a signature of the payment request packet that includes metadata; identify a firmware update status from the metadata of the signature; determine that the IoT device has a first version of the firmware installed on the IoT device based on the firmware update status; cause a second version of the firmware to be installed on the IoT device in response to determining the IoT device has the first version of the firmware; and initiate a transaction based on the payment request packet responsive to the second version of the firmware being installed on the IoT device.

20 Claims, 4 Drawing Sheets

MOBILE AS A BANKING GATEWAY FOR SMART APPLIANCES WITH FUTURE NETWORKS

TECHNICAL FIELD

The disclosure relates to internet of things (IoT) devices, and in particular to systems and methods for updating firmware of IoT devices via NB-IoT and/or LTE-M networks.

BACKGROUND

Current digital retail payments are primarily based on Application Programming Interfaces (API). Such APIs may include Zelle®, Unified Payments Interface (UPI), Apple® or Google® Wallets® and the like and/or cards and card-like instruments which rely on physical proximity for payments. The physical proximity may include, for instance, swiping a magnetic strip of a card through a reader, inserting a chip of a card into a chip reader, tapping a near-field communication (NFC) antenna on an NFC reader, etc.

Additionally, with a wider coverage of 5G and WiFi6 networks, IoT (Internet of Things) devices are expected to become ubiquitous. The IoT devices may include smart meters, smart washing machines, smart refrigerators, or other IoT based devices. These IoT devices are expected to enhance customer experience.

SUMMARY

In one aspect, this disclosure is directed to a method. The method includes receiving, by one or more processors of a user device, a payment request packet from an Internet of Things (IoT) device. The method includes extracting, by the one or more processors, a signature of the payment request packet that includes metadata. The method includes identifying, by the one or more processors, a firmware update status from the metadata of the signature. The method includes determining, by the one or more processors, that the IoT device has a first version of the firmware installed on the IoT device based on the firmware update status. The method includes causing, by the one or more processors, a second version of the firmware to be installed on the IoT device in response to determining the IoT device has the first version of the firmware. The method includes initiating, by the one or more processors, a transaction based on the payment request packet responsive to the second version of the firmware being installed on the IoT device.

In some embodiments, the method further includes retrieving, from a server corresponding to the IoT device, by the one or more processors, the second version of the firmware and transmitting, to the server corresponding to the IoT device, by the one or more processors, the second version of the firmware to cause installing at the IoT device the second version of the firmware. In some embodiments, causing the second version of the firmware to be installed includes transmitting a signal to the IoT device which causes the second version of the firmware to be downloaded and installed on the IoT device. In some embodiments, the at least one of the user device and the IoT device is communicatively coupled to an edge device. In some embodiments, the payment request packet is received via at least one of LTE-M (Long Term Evolution for Machines) and NB-IoT (Narrowband IoT) networks.

In some embodiments, at least one of the signature of the payment request packet and the metadata of the signature further comprises at least one of GPS coordinates to verify location of the IoT device using its GPS coordinates, an Integrated Circuit Card Identification Number (ICCID), or a firmware signature. In some embodiments, the payment request packet includes an image, which is processed to perform at least one of identifying items for purchase and initiating a purchase transaction in response to the second version being installed. In some embodiments, the method further includes registering the IoT device with one or more databases. The method may further include the registering the IoT device with the one or more databases by storing data corresponding to the IoT device in at least one of an IoT manufacturer's database or a database of an enterprise supporting an application on the user device.

In another aspect, this disclosure is directed to a device. The device includes one or more processors. The one or more processors may be configured to execute instructions to receive a payment request packet from an Internet of Things (IoT) device. The one or more processors may be configured to execute instructions to extract a signature of the payment request packet that includes metadata and identify a firmware update status from the metadata of the signature. The one or more processors may be configured to execute instructions to determine that the IoT device has a first version of the firmware installed on the IoT device based on the firmware update status and cause a second version of the firmware to be installed on the IoT device in response to determining the IoT device has the first version of the firmware. The one or more processors may be configured to execute instructions to initiate a transaction based on the payment request packet responsive to the second version of the firmware being installed on the IoT device.

In some embodiments, an instruction to cause the second version of the firmware to be installed includes instructions to retrieve, from a server corresponding to the IoT device, the second version of the firmware, and transmit, to the server corresponding to the IoT device, the second version of the firmware to cause installing at the IoT device the second version of the firmware. In some embodiments, the user device and the IoT device are communicatively coupled to an edge device. In some embodiments, the payment request packet is received via at least one of LTE-M (Long Term Evolution for Machines) or NB-IoT (Narrowband IoT) networks. In some embodiments, the one or more processors are configured to execute instructions to register the IoT device with one or more databases. In some embodiments, to register the IoT device with the one or more databases, the one or more processors are configured to execute instructions to store data corresponding to the IoT device in at least one of an IoT manufacturer database or a database of an enterprise supporting an application on the user device. In some embodiments, at least one of the signature of the payment request packet and the metadata of the signature further includes at least one of GPS coordinates to verify location of the IoT device using its GPS coordinates, an Integrated Circuit Card Identification Number (ICCID), or a firmware signature. In some embodiments, the payment request packet includes an image, which is processed to perform at least one of identifying items for purchase or initiating a purchase transaction for the items.

In another aspect, this disclosure is directed to a non-transitory computer readable medium storing instructions that, when executed by one or more processors, cause the one or more processors to receive a payment request packet from an Internet of Things (IoT) device and extract a signature of the payment request packet that includes metadata. The instructions further cause the one or more processors to identify a firmware update status from the metadata of the signature and determine that the IoT device has a first version of the firmware installed on the IoT device based on the firmware update status. The instructions further cause the one or more processors to cause a second version of the firmware to be installed on the IoT device in response to determining the IoT device has the first version of the firmware and initiate a transaction based on the payment request packet responsive to the second version of the firmware being installed on the IoT device.

In some embodiments, the payment request packet is received via at least one of LTE-M (Long Term Evolution for Machines) or NB-IoT (Narrowband IoT) networks. In some embodiments, at least one of the signature of the payment request packet and the metadata of the signature further includes at least one of GPS coordinates to verify location of the IoT device using its GPS coordinates, an Integrated Circuit Card Identification Number (ICCID), or a firmware signature.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
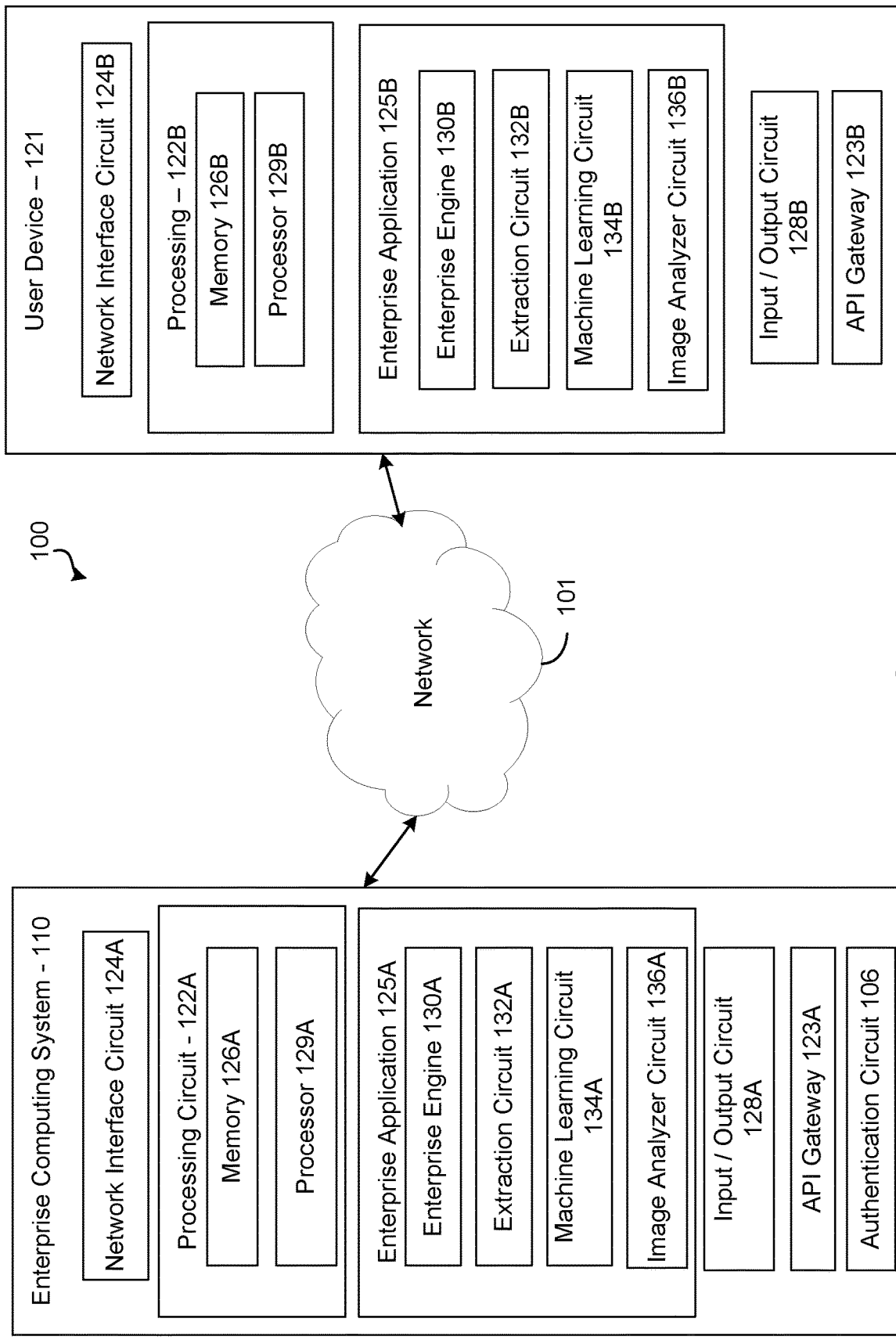
FIG. 1 is a schematic diagram of a computing system, according to an example implementation of the present disclosure.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems and methods for updating the firmware of IoT devices are described herein. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

An IoT device includes one or more processors, sensors, actuators, and other components disposed within, incorporated in, connected to, or otherwise in communication with other devices, such as, for example, a household appliance. Typically, the IoT devices leverage WiFi and other low range peer-to-peer networks such as Bluetooth, Zigbee, Z-Wave, and/or Radio-Frequency Identification (RFID) networks for communication with a network. Therefore, a user located outside of a coverage area of such networks (or where the IoT device loses network connectivity) may not be able to effectively manage their IoT devices. As a result, some of the functions of the IoT devices may not be efficiently/effectively controlled by user. For example, updating firmware and/or security patches may not be timely due to reliance of the IoT devices on the low range peer-to-peer networks. Additionally, consumption of power by the IoT devices using such low range peer-to-peer networks is relatively high. For example, a given household or space may include several IoT devices. Since there typically is not a centralized entity which manages such IoT device within the space, each of the IoT devices may manage their own update (e.g., software/firmware update) status.

The embodiments described herein solve the technical problems caused by reliance on the low range peer-to-peer networks. Usage of Long Term Evolution-Mobile (LTE-M) and/or Narrow Band-IoT (NB-IoT) connectivity based on the IoT data requirements for latency and bandwidth for low-value and high-volume traffic may be leveraged to provide more stable networks for IoT devices, greater coverage area, and better overall user experience in managing such devices. For instance, The IoT device may have one or more chips/antennas/communication devices configured to communicate via NB-IoT and/or LTE-M, to communicatively couple the IoT devices to one or more external systems/devices/applications (such as a banking client application shown in FIGS. 1-3). For instance, an enterprise (such as a banking enterprise) may provide a software or client application that is installed or deployed on or otherwise accessible by user devices. The client application may be used primarily for banking transactions (financial and non-financial). In various embodiments described herein, the client application may serve as an IoT gateway to complete transactions leveraging existing Zelle®, UPI, and/or Wallet® or any other service. The usage of cellular low powered NB-IoT and/or LTE-M chips in the IoT devices facilitates connectivity to the IoT gateway on the user device, irrespective of location(s) of the user device and/or IoT device.

The client application facilitates registration and de-registration of the IoT devices, such as, for example, smart appliances. The client application can also perform security testing and/or firmware update status checks. Instructions to initiate and perform transactions may be embedded, incorporated into, or otherwise accessible through the client application based on preferences of the user/customer. Recommendations using artificial intelligence (AI) and/or machine learning (ML) models may also be provided. Such models may be based on similar customer profiles and their choices for products/services, frequency of purchase, etc. The user device, such as, for example, a mobile phone of the customer or user and the IoT devices may be communicatively coupled through NB-IoT and/or LTE-M network traffic to perform the transaction.

In various embodiments described herein, a user device (e.g., executing a client application described herein) may receive a payment request packet from an IoT device. The user device may extract a signature of the payment request packet that includes metadata. The user device may identify a firmware update status from the metadata of the signature. The user device may determine that the IoT device has a first version of the firmware installed on the IoT device based on the firmware update status. The user device may cause a second version of the firmware to be installed on the IoT device in response to determining the IoT device has the first version of the firmware. The user device may initiate a transaction based on the payment request packet responsive to the second version of the firmware being installed on the IoT device.

The systems and methods described herein provide many benefits over existing computing systems. According to the systems and methods discussed herein, the user device, by functioning as an IoT gateway, facilitates an additional layer of authorization and more effective integration with a majority of the banking payment interfaces of customer's choice available on banking client application. The user is provided with flexibility to manage IoT devices with the reliable mobile (that may be LTE-M and/or NB-IoT) connectivity. Scalability is provided by adding multiple IoT devices, such as, for example, smart appliances for initiating banking transactions. The user may perform a more effective management of the IoT devices when, for example, an IoT vendor or manufacturer obsoletes the IoT device or releases a patch (e.g., a software patch, security patch, firmware patch, etc.). In some implementations, an audit report for IoT devices may be communicated directly to the enterprise (for example, the financial institution, such as, the bank) or to the user through the client application. The security of the overall IoT device ecosystem of a space is also increased by ensuring that most up-to-date security patches are implemented as part of the present solution, prior to initiating a payment transaction. For example, in response to identifying that the IoT device does not have the current security patches, the user device (e.g., the client application executing on the user device) may trigger downloading and installation of the most up-to-date security patches from a manufacturer's server (e.g., by causing the IoT device to pull the security patches from the server directly, by the user device pulling the security patch and pushing the security patch to the IoT device, etc.). Such updating of the IoT device to the most current security patches may be made prior to initiating the payment transaction, therefore ensuring that the payment transaction is made after any current security patches are installed on the IoT device.

As another example, the NB-IoT and/or LTE-M connectivity facilitates flexibility to create a mesh network for management of the IoT devices, reduces dependency on WiFi or any other low range peer-to-peer networks such as Bluetooth, Zigbee, Z-Wave, and/or Radio-Frequency Identification (RFID) networks. Also, NB-IoT and/or LTE-M are supported by telecommunications providers, therefore, reliability, better indoor coverage, and security of the network traffic may be provided. Beneficially, NB-IoT and LTE-M may not be dependent on the WiFi or any other low range peer-to-peer connection. Therefore, a telecom provider may, for example, make available three to seven times wider coverage as compared to the IoT devices using WiFi or other forms of connectivity. Therefore, the user may control the IoT devices while being located outside of WiFi range of the IoT device (or space in which the IoT device resides). For example, in some embodiments, a cellphone tower, may provide a radius of 3 km (1.864 miles). In some embodiments, the NB-IoT and/or LTE-M IoT devices having a digital SIM (eSIM) facilitate portability and flexibility for the customer to change a provider of mobile service based on network traffic availability.

The IoT devices utilizing NB-IoT and/or LTE-M for connectivity may consume less power, thus battery capacity may be extended and energy management may be optimized in, for example, smart appliances. In some embodiments, the IoT device may include a reserve power source. For example, if a main power of the IoT device is inactive/off (such as a power to an appliance connected to the IoT device), a reserved power for the chip remains on so that the chip can transmit and receive signals. This feature facilitates constant communication of the IoT device with, e.g., the cell phone tower, even when the main power to the IoT device is turned off. By providing reserve power, the IoT device could provide intelligent alerts relating to outages at a space without power needs to the appliance in which the IoT device is connected. Various other benefits of the existing solution are described in greater detail below.

Referring now to FIG. 1, a schematic diagram of a computing system 100 for systems and methods for updating firmware of IoT devices having NB-IoT and/or LTE-M network is shown, according to an exemplary embodiment. Computing system 100 is shown to include an enterprise computing system 110 associated with an enterprise and the user device 121 associated with the user (e.g., a client of the enterprise). Devices and components in FIG. 1 can be added, deleted, integrated, separated, and/or rearranged in various embodiments of the disclosed embodiments. The various systems and devices may be communicatively and operatively coupled through a network 101. Network 101 may permit the direct or indirect exchange of data, values, instructions, messages, and the like (represented by the arrows in FIG. 1). The network 101 may include one or more of the Internet, cellular network, Wi-Fi, Wi-max, a proprietary network, or any other type of wired or wireless network of a combination of wired or wireless networks.

Both the enterprise computing system 110 and the user device 121 may be any type of electronic device including standalone computers (e.g., laptop computers, desktop computers, etc.), and/or mobile devices (e.g., smart phones, personal digital assistants, tablet computers, etc.). Similarly, both the enterprise computing system 110 and the user device 121 may be structured as one or more server computing systems, for example, comprising one or more networked computer servers having a processor and non-transitory machine readable media.

Both the enterprise computing system 110 and the user device 121 may include a network interface circuit 124A and 124B respectively (hereinafter called "network interface circuit 124"), a processing circuit 122A and 122B respectively (hereinafter called "processing circuit 122"), a memory of the processing circuit 126A and 126B respectively (hereinafter called "memory 126"), a processor of the processing circuit 129A and 129B respectively (hereinafter called "processor 129"), an input/output circuit 128A and 128B respectively (hereinafter called "input/output circuit 128"), and an application programming interface (API) gateway 123A and 123B respectively (hereinafter called API gateway 123).

The network interface circuit 124 is structured to receive communications from and provide communications to the enterprise computing system 110 and/or the user device 121. In this regard, the network interface circuit 124 is structured to exchange data, communications, instructions, and the like between the enterprise computing system 110 and the user device 121. The network interface circuit 124 of the enterprise computing system 110 and the user device 121 is structured or adapted for and configured to establish a communication session via the network 101. The network interface circuit 124 includes programming and/or hardware-based components that couple the enterprise computing system 110 and/or the user device 121 to the network 101. For example, the network interface circuit 124 may include any combination of a wireless network transceiver (e.g., a cellular modem, a Bluetooth transceiver, a Wi-Fi transceiver) and/or a wired network transceiver (e.g., an Ethernet transceiver). In some embodiments, the network interface circuit 124 includes the hardware and machine-readable media structured to support communication over multiple channels of data communication (e.g., wireless, Bluetooth, near-field communication, etc.). Further, in some embodiments, the network interface circuit 124 includes cryptography module(s) to establish a secure communication session (e.g., using the IP Sec protocol or similar) in which data communicated over the session is encrypted and securely transmitted. In this regard, firmware data (or other types of data) may be encrypted and transmitted to prevent or substantially prevent the threat of hacking or unwanted sharing of information.

To support the features of the enterprise computing system 110 and/or the user device 121, the network interface circuit 124 provides a relatively high-speed link to the network 101, which may be any combination of a local area network (LAN), an intranet, the Internet, or any other suitable communications network, directly or through another interface.

The processing circuit 122 may include at least one memory 126 coupled to a processor 129. The memory 126 includes one or more memory devices (e.g., RAM, NVRAM, ROM, Flash Memory, hard disk storage) that store data and/or computer code for facilitating at least some of the various processes described herein. That is, in operation and use, the memory 126 stores at least portions of instructions and data for execution by the processor 129 to control the processing circuit 122. The memory 126 may be or include tangible, non-transient computer-readable volatile memory and/or non-volatile memory. The processor 129 may be implemented as one or more processors, application specific integrated circuits (ASICs), field programmable gate arrays (FPGAs), digital signal processors (DSPs), and/or other suitable electronic processing components.

The input/output circuit 128 includes communication circuitry for facilitating the exchange of data, values, messages, and the like between an input/output device and user(s) using the enterprise computing system 110 (or other users using the user device 121). In yet another embodiment, the input/output circuit 128 includes machine-readable media for facilitating the exchange of information between an input/output device and an administrator or another user. In still another embodiment, the input/output circuit 128 includes any combination of hardware components, communication circuitry, and machine-readable media. Hardware components can include a touchscreen, a keypad, microphone, camera, or buttons for receiving user inputs. Components of the input/output circuit 128 display text, and/or transmit audio to/from one or more administrators and/or users. Additionally or alternatively, the input/output circuit 128 may be configured to display graphics such as menus, instructions, questions, background photos (e.g., advertisements, etc.), logos, dynamic user interfaces and so on generated by an enterprise application 125. In one embodiment, the display is a touchscreen display that is capable of detecting user touches, e.g., to provide user inputs. In other embodiments, the user(s) may generate user inputs via a mouse, keyboard, and the like.

The enterprise computing system 110 and user device 121 may also include an API gateway 123. The API gateway 123 may be configured to facilitate the transmission, receipt, authentication, data retrieval, and/or exchange of data between the components (e.g., applications) of the enterprise computing device 110, the user device 121, or third party servers/computing systems as described in greater detail below.

An API is a software-to-software interface that allows a first computing system of a first entity to utilize a defined set of resources of a second (external) computing system of a second (external) entity to, for example, access certain data and/or perform various functions. In such an embodiment, the information and functionality available to the first computing system is defined, limited, or otherwise restricted by the second computing system. To utilize an API of the second computing system, the first computing system may execute one or more APIs or API protocols to make an API "call" to (e.g., generate an API request that is transmitted to) the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), receiving or retrieving status information (such as software/firmware update status), downloading or retrieving software or firmware, etc.

The API gateway 123 may be configured to facilitate the communication and exchange of content and data between the enterprise computing system 110, the user device 121, and/or various third-party servers (such as servers of IoT device manufacturers). To process various API calls, the API gateway 123 may receive, process, and respond to API calls using other circuits of the enterprise computing system 110 and/or the user device 121. Additionally, the API gateway 123 may be structured to receive communications (e.g., API calls, API response data, etc.) from other circuits of the enterprise computing system 110 and/or the user device 121. That is, other circuits may communicate content and data to the enterprise computing system 110 and/or the user device 121 via the API gateway circuit 123. Therefore, the API gateway 123 is communicatively coupled to other circuits of the of the enterprise computing system 110 and/or the user device 121, either tangibly via hardware, or indirectly via software.

The user device 121 is configured to run a variety of application programs and store associated data in a database of the memory 126B. One such application run by the user device 121 (and executed via the processing circuit 122B) may be the enterprise application 125. It should be appreciated that while the enterprise application 125 is shown as being operated by the user device 121, the user device 121 may execute a third party application capable of performing the same operational and functional objectives as the enterprise application 125. In other embodiments, an application capable of performing the same operational and functional objective as the enterprise application 125 may be executed by one or more other servers/computing systems (e.g., a disinterested party in the agreement between the enterprise and the user). Generally, the enterprise application 125 may be configured agnostic to the system executing the engine. Further, the enterprise application 125 may maintain, use, or otherwise access data/resources from other applications of the different parties. Each application maintained, used, or otherwise accessed by the enterprise application 125 may be part of a suite or platform of applications which are accessible by the enterprise application 125. Each of the applications may be locally-hosted applications or resources (e.g., executing on various computing devices), or cloud-hosted or web-based applications or resources provisioned to the system employing the enterprise application 125 by one or more users, third parties, disinterested parties, and/or the enterprise.

In some embodiments, similar components and functionality of the user device 121 could be incorporated in the enterprise computing system 110. In some embodiments, the enterprise computing system 110 may query the user device 121 for data. In some embodiments, the user device 121 may transmit data to the enterprise computing system 110 without being queried for data. For example, the user device 121 may transmit any data that it is authorized to transmit to the enterprise computing system 110. Additionally or alternatively, the user device 121 may transmit selected data to the enterprise computing system 110 (e.g., data that had been previously selected by the user at the user device 121).

Figure 2:
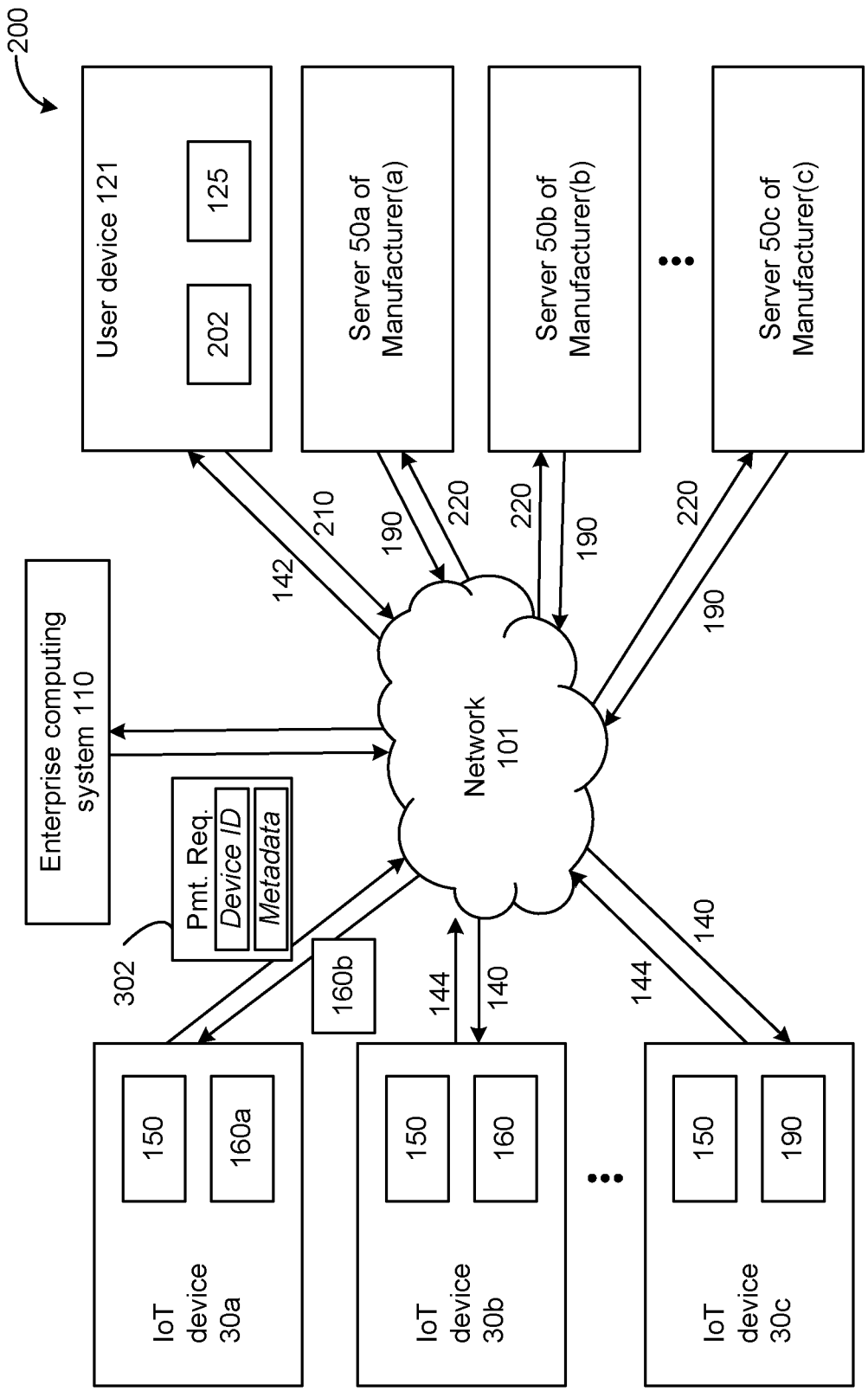
FIG. 2 is a view of a system for updating firmware of the IoT devices via NB-IoT and/or LTE-M networks, according to an example implementation of the present disclosure.

Referring to FIG. 1 and FIG. 2, the enterprise application 125B is a downloaded and installed application that includes program logic stored in a system memory (or other storage location) of the user device 121 that includes an enterprise engine 130B, extraction circuit 132B, a machine learning circuit 134B, and an image analyzer circuit 136B. In some embodiments, the enterprise application 125B is embodied as program logic (e.g., computer code, modules, etc.). During download and installation, and in some embodiments, the enterprise application 125B is stored by the memory 126B of the user device 121 and selectively executable by the processor 129B. The program logic may configure the processor 129B of the user device 121 to perform at least some of the functions discussed herein.

In some embodiments, the enterprise application 125B may be used for managing IoT devices 30, for example, initiating transactions involving the IoT devices 30, as described in greater detail below with reference to FIG. 2. For example, the user utilizing the enterprise application 125 may obtain flexibility to manage IoT devices 30 with the reliable LTE-M and/or NB-IoT network. Adding multiple IoT devices to be managed by the enterprise application 125 (such as, for example, several smart appliances for initiating banking transactions) provides an added benefit of a centralized enterprise application 125. The user device 121 may manage the IoT devices 30 within a predetermined space (e.g., a house), wherein each of the IoT devices may be managed by the user device 121 to obtain statuses of their respective updates (e.g., software/firmware updates). In one example, the user may perform a more effective management of the IoT devices when, for example, an IoT vendor or manufacturer obsoletes the IoT device or releases a patch (e.g., a software patch, security patch, firmware patch, etc.). In some embodiments the enterprise application 125 is a stand-alone application that may be downloaded and installed on the user device 121. In other embodiments, the enterprise application 125 may be a part of another application, such as another enterprise application.

The depicted downloaded and installed configuration of the enterprise application 125 is not meant to be limiting. According to various embodiments, parts, components, or aspects of the enterprise application 125 may be locally installed on the user device 121 and/or may be remotely accessible (e.g., via a browser-based interface) from the user device 121 (or a cloud system in association with the user device 121). In this regard and in another embodiment, the enterprise application 125 is a web-based application that may be accessed using a browser (e.g., an Internet browser provided on the user device 121). In still another embodiment, the enterprise application 125 is hard-coded into memory such as memory 126B of the user device 121 (i.e., not downloaded for installation). In an alternate embodiment, the enterprise application 125 may be embodied as a "circuit" of the user device 121 as circuit is defined herein.

The user device 121 may also include an authentication circuit 106 configured to authenticate users attempting to access the enterprise application 125 (e.g., on the user device 121). The authentication may be in addition to or in place of authentication that may be preferred to access/use the enterprise application 125. In some configurations, the authentication circuit 106 may receive a credential (username and password, answer to security question, passcode, biometric information, etc.) that the authentication circuit 106 matches to one or more stored credentials authorizing (or authenticating) user(s) in memory 126B to configure parameters of the enterprise application 125. For example, memory 126B may contain a lookup table matching user authentication information (e.g., name, home address, IP address, MAC address, phone number, biometric data, passwords, usernames) to an administrator role, where various administrator rules allow users the authority to configure one or more parameters of the enterprise application 125.

In some embodiments, the enterprise engine 130 may receive the payment request packets from memory. For example, the enterprise engine 130 may query memory 126 responsive to the user initiating a transaction or a payment request. In some embodiments, the enterprise engine 130 may query memory 126 in response to a trigger. For example, the processor of the IoT device 30 may initiate a transaction, then, the IoT device 30 processor generates the payment request packet 302 which is transmitted by the processor(s) of the IoT device to the enterprise application 125 installed on the user device 121.

Referring to FIG. 2, depicted is a block diagram of a system 200 comprising a device 121 for updating the firmware of the IoT device 30, according to an exemplary embodiment. The system 200 may include one or more IoT devices 30, server(s) 50 of manufacturer(s), user device(s) 121, as well as the network(s) 101 communicatively coupling these components of the system 200. The IoT devices 30 may be, for example, IoT device 30a, IoT device 30b, and IoT device 30c. The IoT device 30 may comprise a smart refrigerator, a smart washing machine, a smart toaster, and/or other similar household devices/appliances. The system 200 may include one or more server(s) 50 of manufacturers of the IoT devices 30 (e.g., the server 50a of manufacturer(a) of IoT device 30a, the server 50b of manufacturer (b) of IoT device 30b, and the server 50c of manufacturer of the IoT devices 30c, and so forth).

Figure 3:
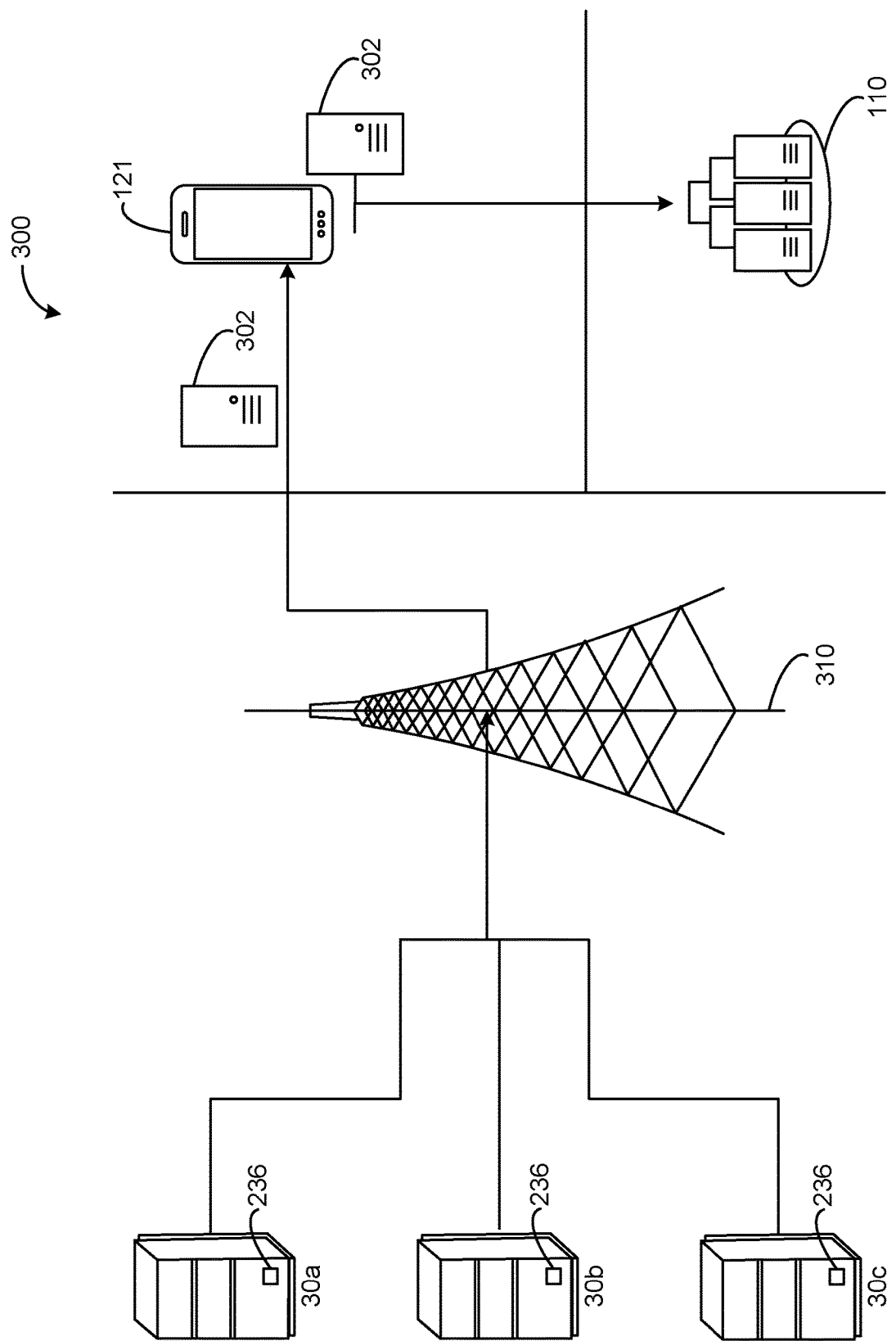
FIG. 3 is a schematic diagram of a system for updating firmware of the IoT devices, according to an example implementation of the present disclosure.

Referring to FIG. 2 and FIG. 3, and in some embodiments, the user device 121 may be configured to receive a payment request packet 302 from the IoT device 30. Such communication of the payment 302 request packet may occur through at least one processor of the user device 121. The processor(s) of the IoT device 30 transmit the payment request packet 302 through the network 101 (such transmission is generally illustrated by arrow 144) and through the network 101 to the user device 121 (such transmission is generally illustrated by arrow 142). For example, the processor of the IoT device 30 may initiate the following transactions to generate the payment request packet 302. In some embodiments, the processor of the IoT device 30 may initiate transactions at various intervals, for example, for regularly scheduled purchases, such as detergent, milk, eggs, and/or groceries, etc. In some embodiments, the processor of the IoT device 30 may initiate transactions responsive to a detected usage or completion of usage, for example, when a life operation cycle of certain disposal parts are completed (for example, air filters for HVAC system, water filters, etc.) and/or when the maintenance is to be performed based on the hours in the life cycle. Alternatively or optionally, such replacement may occur periodically, such as for example, quarterly. In some embodiments, the processor of the IoT device 30 may initiate transactions based on image processing of an appliance sensor (for example, the sensor installed within the smart refrigerator detects a low stock or lack of milk, butter, bottled water, groceries, etc.). In some embodiments, the processor of the IoT device 30 may initiate transactions in response to a user request sent to the user device 121 by the processor(s) of the IoT device (for example, the processor of a household appliance sending a notification to order an air or water filter).

In some embodiments, the user device 121, for example, a smartphone may be a gateway for the IoT device 30. In particular, the enterprise application 125 may be a gateway for the IoT device 30. For example, the enterprise application 125 may be configured to check a current version 160*a* of the firmware to verify if is up to date, i.e., if it is identical to, is equal to, or matches, etc. a latest version 160*b* of the firmware. Where the current version 160*a* is not up to date, the enterprise application 125 may be configured to cause the IoT device 30 to update the version 160 of the firmware. For example, and in some embodiments, the enterprise application 125 may be configured to transmit instructions to the IoT device 30 to download the latest firmware version 160 *b*. As another example, the IoT device 30 itself may retrieve the latest version 160*b* (e.g., responsive to receiving a signal or instruction form the enterprise application 125). As yet another example, the enterprise application 125 may be configured to retrieve the latest version 160*b* of the firmware, and "push" the version 160*b* to the IoT device 30 for further installation of the latest version 160 *b*. Each of these examples are described in greater detail below.

The network 101 may include a gateway device, an edge device, a Local Area Network (LAN), a Wide Area Network (WAN), a Wireless Local Area Network (WLAN), an Internet Area Network (IAN), cloud-based network, and any other similar types of networks.

The at least one processor 202 of the user device 121 may be configured to extract a signature 150 of the payment request packet 302. The signature 150 of the payment request packet 302 may include metadata 170. In some embodiments, the signature 150 of payment request packet 302 and/or the metadata 170 of the signature 150 may include an Integrated Circuit Card Identification Number (ICCID) and/or a firmware signature.

In some embodiments, the metadata 170 of the signature 150 is configured to include the current status of the version 160 of the firmware installed on the IoT device 30. In some embodiments, such status may include information whether any versions 160 of the firmware are installed on the IoT device 30. In some embodiments, the status of the version 160 of the firmware may include an identification of the version 160 of the firmware, for example, whether it is the first version or the second version and/or whether the first version is the original version installed on the IoT device during a manufacturing process.

As an example, the first version of the firmware may be the original (e.g., factory) firmware installed on the IoT device during manufacturing or it can be one of the subsequent versions of the firmware. The second version of the firmware is any current version of the firmware that is subsequent to the first version of the firmware. Such update of the firmware version on the IoT processor may be performed via one or more methods described herein. For example, in some embodiments, over-the-air (OTA), "push", and/or "pull" updates may be employed. In some embodiments, for example, a server 50 of the manufacturer of the IoT devices 30 may periodically update the firmware version. The server 50 of the manufacturer may automatically push an updated version of the firmware to the processor of the IoT device 30. In some embodiments, the server 50 of the manufacturer may push the updated firmware to the processor of the IoT device 30 after every update, according to a predetermined update schedule (e.g., push the updated firmware to the processor of the IoT device 30 on the first of every month), or upon receiving a request for the updated firmware from the user device 121 or the IoT device 30 as described in greater detail below.

Referring still to FIG. 2 and FIG. 3, in some embodiments, when one or more processors 202 of the user device 121 receive the payment request packet 302, the processor 202 may extract the signature 150 of the payment request packet 302 (that may include metadata 170 of the signature 150). In some embodiments, the processor 202 may identify the status of the version 160 of the firmware installed on the IoT device 30. The processor 202 of the user device 121 may perform such identification of the status of the version 160 based on its processing of the metadata of the signature 150.

If the processor 202 determines that the second version of the firmware is installed on the IoT device 30, then, the processor(s) of the system 200 may initiate the payment for checking the status of the firmware update. If the processor 202 of the user device 121 determines that the IoT device 30 has the first version of the firmware installed, then the processor 202 causes the second version of the firmware to be downloaded and installed on the IoT device 30.

In some embodiments, such installation of the second version of the firmware on the IoT device 30 may include transmitting instructions via the network 101 (such transmission is generally denoted by arrow 210), to the manufacturer server 50 (such transmission is generally denoted by arrow 220). In some embodiments, the server(s) 50 of the manufacturer may transmit a data packet including the second version of the firmware via the network 101 (such transmission is generally denoted by arrow 190 directly to the IoT device 30 (such transmission is generally denoted by arrow 140). It is noted that, while referred to as "directly to the IoT device 30," it should be understood that routing via the network 101 may include transmission of the packet to various network devices/intermediaries along a network path between the processor(s) and the IoT device 30. However, in this example, the server(s) 50 of the manufacturer may transmit the packet to the IoT device 30 directly as opposed to transmitting to the user device 121 for routing/transmitting/providing to the IoT device 30.

In some embodiments, the IoT devices 30 may include location sensors 236. For example, the location sensors 236 may include global positioning system (GPS) devices and other navigation and geolocation devices, digital compasses, gyroscopes and other orientation sensors, as well as proximity sensors or other sensors that allow the IoT device 30 to detect the presence and relative distance of nearby objects and devices. As an example, one or more processors of the system 200 may have a location logic. Thus, an enhanced protection against fraudulent transactions is provided, as described below. The location logic may use a satellite (GPS) sensor or cellular towers to determine the location coordinates of the IoT device 30.

In some embodiments, the signature 150 of payment request packet 302 and/or the metadata 170 of the signature 150 may further comprise GPS coordinates to verify location of the IoT device 30 using GPS coordinates of the IoT device 30. In some embodiments, the signature 150 may include, for example, the following parameters that are transmitted from the IoT device 30: the GPS coordinates of the IoT device 30 and the name of the manufacturer.

For example, the address or other location information may be retrieved from the location logic. The location of the IoT device 30 and the previously registered location of the IoT device 30 are compared to ensure a match. Ensuring that the IoT device 30 is at the same location as the previously registered location of the IoT device 30 helps prevent fraudulent transactions. In one embodiment, a match is ensured by determining the distance between the two locations and ensuring that the distance is within a predetermined distance. For example, the predetermined distance may be up to 50, 100, 200 feet or another distance. In one embodiment, the processor(s) of the system 200 transmits the location of the IoT device 30 to the enterprise computer system 110 and the comparison is performed at the enterprise computer system 110. In another embodiment, the comparison is performed by one or more of the processors of the user device 121. The comparison may also be performed at both locations by both computing systems/devices.

In another embodiment, in addition to determining whether the IoT device 30 is at the same location as the previously registered location of the IoT device 30, the user device 121 may be configured to determine whether the IoT device 30 is inside/outside a predetermined geographic region. For example, the user device 121 may be configured to determine whether the IoT device 30 is outside the United States where the IoT device 30 is registered with the user device 121 at a location within the United States. For example, if it is known that the user has not recorded any IoT devices 30 outside the United States, and if the IoT device 30 is outside the United States, then the transaction may be denied. While described as within/outside of the United States, it is noted at the geographic region could be at the regional, state, city, etc. level, or at the household/home/business address level. This feature to determine whether the IoT device 30 is outside the predetermined geographic region may provide a second, independent test of the location of the IoT device 30 to ensure that the transaction does not appear fraudulent. As another example, it may be determined whether the IoT device 30 is within one or more specified foreign countries. The location of the IoT device 30 may be determined and checked by the processor(s) of the system 200 when the transaction is initiated and at multiple times throughout the transaction to guard against cyber attacks.

Referring still to FIG. 2, in some embodiments, the current version 160*a* that is installed on the IoT device 30*a* may be a first version (e.g., an outdated version). The IoT device may be configured to transmit a payment request packet 302 via the network 101 to the user device 121. The payment request packet 302 may include information relating to the transaction (e.g., items for purchase, amount of items, purchase/transaction amount, etc.), device identification information (e.g., a device ID, a device signature, an Integrated Circuit Card Identification Number (ICCID), etc.), and/or device metadata (e.g., a device signature, a firmware version number, etc.). In other words, the payment request packet 302 may be configured to include information about the current version 160*a* installed on the IoT device 30.

The user device 121 may be configured to receive the payment request packet 302 from the IoT device 30*a*. The user device 121 may be configured to parse, inspect, or otherwise analyze the payment request packet to identify the information about the current version 160*a* installed on the IoT device 30. For example, the user device 121 may be configured to identify the firmware version number and ICCID of the first IoT device 30*a*. The user device 121 may be configured to determine whether the first version 160*a* is current (e.g., up-to-date or latest) for the IoT device 30*a* prior to performing or initiating the transaction. In some embodiments, the user device 121 may be configured to transmit the firmware signature along with a query to the manufacturer server 50 requesting the latest version 160*b* (or identifier of the latest version 160*b*) of the firmware (for example, the second version of the firmware). The user device 121 may transmit the firmware signature, via, for example, an API call to the server 50 of the manufacturer. The server 50 may be configured to respond to the user device 121 indicating that the first version 160*a* installed on the IoT device 30 is out of date (for example, by sending an identifier of the second version 160 *b*), by sending a notification which indicates that the second version 160*b* is available, by sending the second version 160 *b*, etc.). The user device 121 may trigger or otherwise cause updating the IoT device 30 responsive to determining that the current version 160*a* is out of date.

In some embodiments, for example, the user device 121 triggers the IoT device 30 to update its firmware. The user device 121 may use the signature 150 to identify an IoT device identifier. The user device 121 may send the device identification (for example, GPS coordinates, an Integrated Circuit Card Identification Number (ICCID), and/or a firmware signature) to the manufacturer server 50, wherein the device identification is accompanied with a status request for the firmware. The manufacturer server 50 in response to such request from the user device 121 may be configured to look up the up-to-date version 160*b* of the firmware corresponding to the IoT device 30 and respond with a correct firmware version number. The user device 121 may be configured to transmit a signal to the IoT device 30. The IoT device 30 may be configured to receive the signal and transmit a request to the manufacturer server 50 requesting the correct firmware version 160*b* (by, e.g., using the correct version number). In response, the manufacturer server 50 is configured to push the up-to-date version 160*b* of the firmware to the IoT device 30.

As one example, the IoT device 30 may be configured to update the firmware version of the IoT device 30. The IoT device 30 may be configured to update the firmware status responsive to receiving a trigger or signal from the user device 121 (e.g., in response to an operation of the enterprise application 125 executed on the user device 121). The IoT device 30 may be configured to update the firmware version by retrieving the firmware version 160*b* from the manufacturer server 50. Such updating option facilitates a faster update of the firmware because less time is spent to identify the properties of every IoT device 30, to look up the available latest firmware version 160*b* (or firmware patch), and, then, to download and update the IoT device 30 with the latest version 160 *b*. Therefore, a more scalable and effective management of the IoT devices 30 are achieved due to the LTE-M and/or NB-IoT connectivity of the IoT devices 30. Thus, in some embodiments, the processor(s) of the IoT device 30 may be configured to update the firmware when the IoT gateway receives the latest patch of the firmware version 160b causing the IoT device 30 to initiate and complete the update.

In some embodiments, the user device 121 may pull the firmware from the manufacturer server 50 and transmits the firmware to the IoT processor. The user device 121 may use the signature 150 to identify an IoT device identifier/identification (such as, for example, the metadata of the signature that may include, for example, the GPS coordinates, the ICCID, and/or the firmware signature). The user device 121 may send the device identification to the manufacturer server 50 accompanied with a request for a status of the firmware. The manufacturer server 50 in response to receiving the request from the user device 121, may be configured to perform a look-up function using the device identification to pull the up-to-date firmware version 160 b, and respond to user device 121 providing the new version 160b of the firmware. Then, the user device 121 may be configured to push the firmware version 160b to the IoT device 30.

As another example, the processor(s) of the IoT device 30 may update the firmware version of the IoT device 30 by the IoT processor initiating a request for the firmware of the IoT device 30 to receive security patches directly from the server 50 of the manufacturer. It is noted that, while referred to as "directly from the server 50 of the manufacturer," it should be understood that routing via the network 101 may include transmission of the packet to various network devices/intermediaries along a network path between various computing devices of the system 200 and the IoT device 30. However, in this example, the server(s) 50 of the manufacturer may transmit the packet to the IoT device 30 directly as opposed to transmitting to the user device 121 for routing/transmitting/providing to the IoT device 30. This may cause the IoT devices 30 to open port(s) beyond connecting to the IoT processor. Such method may be made configurable based on a type of transaction and the IoT device 30 may be configured to initiate the transaction. For example, the processor(s) of the system 200 may be configured to transmit, via the network traffic 101, the data packet including the second version of the firmware to the user device 121 and then to the IoT device 30 (via the network 101). Upon downloading of the second version of the firmware by the IoT device 30, one or more processor(s) of the IoT device 30 may be configured to install the second version of the firmware on the IoT device 30.

In some embodiments, the user device 121 may be configured to pull the firmware from the manufacturer server 50 and transmit the firmware to the IoT processor. The user device 121 may be configured to use the signature 150 to identify an IoT device identifier/identification (such as, for example, the metadata of the signature that may include, for example, the GPS coordinates, the ICCID, and/or the firmware signature). The user device 121 may send the device identification to the manufacturer server 50 accompanied with a request for a status of the firmware. The manufacturer server 50 in response to such request from the user device 121 may look up the up-to-date version 160b of the firmware corresponding to the IoT device 30 and send the up-to-date version 160b of the firmware to the IoT device 30.

It should be appreciated that while the firmware update of the IoT device 30 is shown as being updated using the NB-IoT and/or LTE-M network, the firmware of any other device may be updated via the NB-IoT and/or LTE-M network. In some embodiments, for example, a firmware of a thermostat, devices of an audio system, an HVAC system that may not have the IoT device 30 installed as a component of the system (to communicatively couple such non-IoT device to the NB-IoT and/or LTE-M network), or the like devices may be updated using the methods and systems described herein. In some embodiments, the user may perform such updates using the enterprise application 125 in combination with, for example, the edge device. For example, an edge device may be deployed at a location and communicably coupled to various non-NB-IoT/LTE-M IoT devices 30 at the location. The edge device may include one or more communication systems for communicating via NB-IoT/LTE-M such that similar long-range communications may be provided between the user device 121 and non-NB-IoT/LTE-M IoT devices 30 through the edge device.

Referring specifically to FIG. 3, illustration of one of the embodiments of a communication system 300 for transmitting the payment request packet 302 is shown. In some embodiments, as described in the specification, the following may be involved in the implementation of the systems and methods disclosed herein: (i) the IoT device 30 installed in, for example, a smart appliance (sometimes, the IoT device 30 is referred herein to as "an appliance"); (ii) user devices 121, such as, for example, a handheld device running a enterprise application 125 supported by the enterprise; (iii) the enterprise application 125; and (iv) enterprise's back end and its support. It should be appreciated that while the IoT device 30 is described herein as an appliance, the IoT may be a separate component of an appliance (for example, an adapter), and/or the appliance itself could be referred to as the IoT device 30.

In some embodiments, the IoT device(s) 30a, 30b, and 30c may comprise one or more communication devices/components, antennas, or the like that is/are configured to communicate via NB-IoT and/or LTE-M network with a cell phone communication tower 310 that transmits the payment request packet 302 to the user device 121.

In some embodiments, the user device 121 may be configured to automatically perform the steps of the method 400 (e.g., of FIG. 4) to update the version of the firmware without the user input. Such configuration may be made on the back-end of the enterprise system that supports the enterprise application 125. In some embodiments, the user device 121 may be configured to register the IoT device 30 at one or more databases. Such databases may belong to a manufacturer of the IoT devices 30 and/or the enterprise that provides an enterprise application 125 to the user device 121.

According to one example use case of the instant disclosure, and in some embodiments, the IoT device 30 may be a smart refrigerator (or a component connected to a smart refrigerator). An IoT adapter in the smart fridge may be registered with, for example, a mobile phone IoT gateway registering Integrated Circuit Card Identification Number (ICCID) of the IoT, firmware signature, and/or GPS coordinates. Some smart refrigerators may include an interface to add, for example, a grocery list along with expiration dates, cameras (e.g., internal cameras capturing images of an interior space of the refrigerator), as well as the IoT processor for transmitting signals.

In some embodiments, the IoT device 30 may send a message to the user device 121 based on a configurable periodicity (measured, for example, in seconds, minutes, hours, etc.) containing ICCID, firmware signature, GPS coordinates, the image (e.g., in the form of a digital representation) of the stock of products inside the fridge. For example, the IoT device 30 may have a camera that periodically captures an image of the objects disposed within or in near proximity of the IoT device (e.g., the groceries in the smart fridge). The image data is processed by an image analyzer circuit 136 (FIG. 1) which compares the image of the object against prior images of the objects previously stored in the system 300, as well as any other trend and historical data, or any other data about that object (e.g., consumption data). The enterprise application 125 may be configured to receive the message and image(s) from the IoT device 30. The enterprise application 125 may be configured to validate ICCID, GPS coordinates, and/or firmware signature against pre-configured data. The digitized image is passed to a pre-trained deep neural network such as Convolutional Neural Network (CNN) for predicting groceries availability/needs. In some embodiments, the enterprise computing system 110 may train the CNN or any other deep neural network based on image datasets such as ImageNet, Freiburg and/or other datasets.

In some embodiments, the user device 121 may perform a payment in response to completing installation of the second version of the firmware on the IoT device 30. The payment request packet 302 may include an image, which is processed to perform initiating a purchase transaction in response to the second version being installed and/or identifying items for purchase. For example, in some embodiments, one or more processors of the system 300 may perform image processing for object detection.

In some embodiments, the enterprise application 125 initiates a transaction for procuring groceries based on a model prediction and tracks the order details. The IoT data is periodically transmitted and, if, for example, the ordered groceries were replenished in the fridge, then, the status of the initiated transaction is closed. Sometimes, there could be an offline replenishment; then, an alert to ignore or cancel the transaction is initiated for customer's review and/or input. The customer/user of the banking enterprise application 125 can also pre-configure such selection choices.

Smart appliances with Non-LTE-M or Non-NB-IoT using existing peer-to-peer network may be adapted to utilize the benefits of LTE-M and/or NB-IoT network 101. For example, the system 300 may further include an edge device. In some embodiments, the edge device may be or include two or more communication channels. A first communication channel may be a local communication channel. A second communication channel may be LTE-M/NB-IoT network traffic. The IoT devices that do not have LTE-M/NB-IoT capbilities may be configured to establish a local connection to the edge device via the first channel. As such, edge device may extend functionalities and systems described herein to non-LTE-M/NB-IoT devices. Thus, more effective registration and/or de-registration, security and firmware updates of the IoT devices 30, as well as initiation of the financial transactions are achieved by the embodiments disclosed herein.

Figure 4:
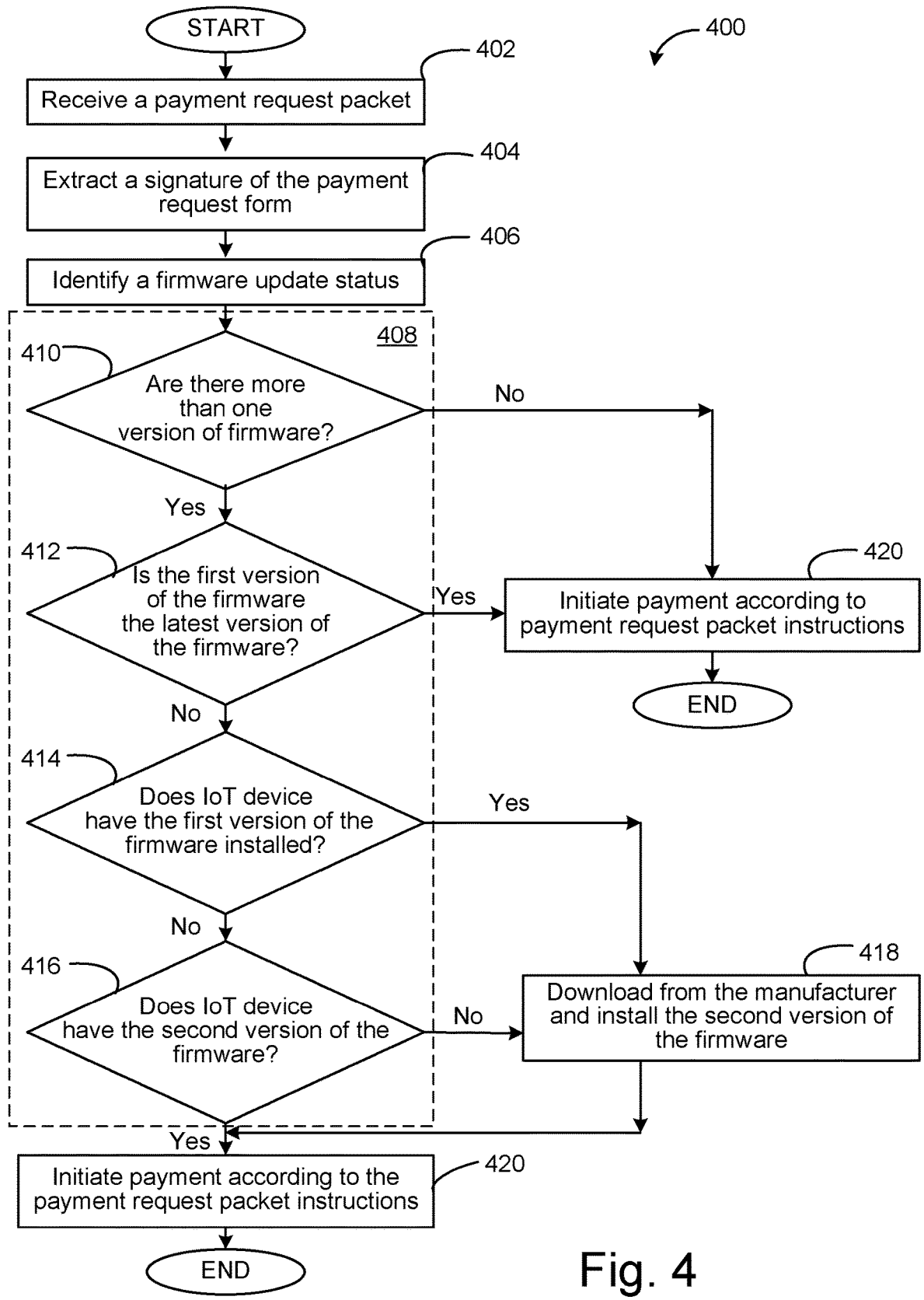
FIG. 4 is a flow diagram illustrating a method of updating a firmware of an IoT device, according to an example implementation of the present disclosure.

Referring now to FIG. 4, a flow diagram of a method 400 for updating firmware of IoT devices via NB-IoT and/or LTE-M network traffic is shown, according to an exemplary embodiment. The method 400 including each of the steps 402-420 may be performed by one or more of the devices or components described above with reference to FIG. 1-FIG. 3. Additionally, while shown as being performed in a particular order, it is noted that the steps of the method 400 may be performed in any order.

In some embodiments, at step 402, a device (e.g., user device 121) may receive a payment request packet 302 initiated by the IoT device 30 and that is transmitted by via network 101 to the device (step 402). The payment request packet 302 may include a digital signature 150 of the IoT device, such digital signature or signature 150 may include metadata 170. In the next step 404, the processor of the user device 121 may extract the signature 150 of the payment request packet 302.

Based on the metadata 170 obtained from the signature 150 of the IoT device 30, the processor of the system 200 (FIG. 2) identifies a status of the firmware update (step 406). The enterprise engine 130 may execute an evaluation procedure 408 during which the enterprise engine 130 evaluates the identified status of the firmware update as shown by the evaluation procedure 408. The enterprise engine 130 may employ any one or more decisions (e.g., evaluation techniques/criteria) to evaluate the firmware version(s) in the evaluation procedure 408. In some embodiments, the enterprise engine 130 employs various gating evaluations as part of evaluation procedure 408.

In some embodiments, one of the decisions is to determine if there are two different versions of the firmware (step 410). If, for example, only one version of the software exist (such determination is made in step 410), or, if, for example, the first version is the latest version of the firmware (step 412), then, the processor(s) of the system 200 (FIG. 2) may initiate the payment for the transaction according to the payment request packet 302 (step 420).

If the first version of the firmware is not the latest version of the firmware, then in the next step 414, the processor of the system 200 (FIG. 2) determines whether the IoT device 30 has the first version of the firmware installed on the IoT device. If the first version of the firmware is installed on the IoT device 30 and it is not the latest version of the firmware (this is determined earlier in step 412), then the subsequent second version of the firmware is downloaded from the manufacturer server 50 and installed on the processor of the IoT device 30 (step 418). Afterwards, the processor(s) of the system 200 (FIG. 2) may initiate the payment for the transaction according to the payment request packet 302 (step 420).

If the first version of the firmware is not installed, then, in step 416, the processor of the system 200 determines whether the second version of the firmware is installed. If such second version of the firmware is installed, then, the processor(s) of the system 200 may initiate the payment for checking the status of the firmware update. If the second version of the firmware is not installed on the IoT device 30, then, in step 418, the processor(s) of the system 200 download the second version of the firmware from the manufacturer server 50 and install the second version on the processor of the IoT device 30 (step 418). Afterwards, the processor(s) of the system 200 may initiate the payment for downloading and installing the second version of the firmware (step 420).

In yet other embodiments, the user(s) and/or administrator(s) may configure the enterprise engine 130 to automatically transfer funds to the third party in response to the process 400 being satisfied. In these embodiments, after step 420, the enterprise engine 130 may transmit a notification to one or more user(s) and/or administrator(s) that payment has been processed. In other embodiments, the user(s) and/or administrator(s) may configure the enterprise engine 130 to request approval before transferring funds to the enterprise and/or the third party. For example, in response to the completed process 400, the user(s) and/or administrator(s) may configure the enterprise engine 130 to prompt the user(s) and/or administrator(s) to determine whether the user(s) and/or administrator(s) wants to complete a payment (e.g., for the firmware update) or a batch of payments corresponding to the firmware updates of the one or more IoT devices 30.

In the embodiments where the enterprise engine 130 is configured to automatically pay for the transaction according to the payment request packet 302 (or pay for the transaction according to the payment request packet 302 in response to receiving approval from one or more user(s) and/or administrator(s)), the enterprise engine 130 may perform one or more foreign currency exchanges. The enterprise engine 130 may be configured to retrieve a foreign exchange rate, purchase a contract to lock in the retrieved foreign exchange rate, and initiate payment to the third party.

Moreover, in the embodiments where the enterprise engine 130 is configured to automatically pay for the firmware update (or pay for the firmware update in response to receiving approval from one or more user(s) and/or administrator(s)), the enterprise engine 130 may store the payment in memory 126A and/or report the payment to one or more downstream applications.

Additionally or alternatively, the enterprise engine 130 may also prompt the user(s) and/or administrator(s) to evaluate whether the user(s) and/or administrator(s) wants to cancel the firmware update or a batch of the firmware update (or de-select one or more selected firmware update(s)). For example, the enterprise engine 130 may transmit a notification to the user(s) and/or administrator(s) with an interactive button that cancels payment of one or more firmware updates, approves payment of one or more firmware updates, and the like. In other embodiments, the user(s) and/or administrator(s) may configure the enterprise application 125 to return to (or navigate to) one or more screens of the enterprise application (e.g., a list of the identified IoT devices 30 requiring the firmware update, a list of evaluated versions of the firmware(s), a payment selection screen, etc.) in response to completing the evaluation procedure 408.

The method to update the firmware of the IoT device 30 may be performed by a non-transitory computer readable medium storing instructions that, when executed by one or more processors, cause the one or more processors to perform the steps of the method. In some embodiments, the method may include transferring a signal by the processor 202 to the IoT device 30 which causes the second version of the firmware to be downloaded and installed on the IoT device 30.

In some embodiments, the user device 121 and/or the IoT device 30 may be communicatively coupled to an edge device. The edge device such as, for example, Google Nest Hub®, Alexa®, etc. may utilize Siri®, Google Assistant®, and other similar virtual assistants, through which alerting signals can be routed for updating the user or customer on the status and any other configurations of the IoT device 30. In some embodiments, the edge devices may have, for example, NB-IoT and/or LTE-M connectivity to communicatively couple to the IoT device 30.

In some embodiments, to provide a secured connection between the IoT device(s) 30 and the edge device(s) described herein, the following may be implemented. For example, a gateway of the IoT device 30 may send a query to the edge device requesting to confirm identity information of other device(s) connected to the edge device. Such verification may be performed, for example, to ensure that no unauthorized access has been granted by the edge device to other users or devices. In some embodiments, for example, one or more processors may perform cross-referencing between the registered devices and the devices/users that are attempting to access the edge device. For example, in response to receiving the query from the IoT device 30, the edge device can send a verification request to one or more processors of the system 200, for example, to the processor 202 of the user device 121 or any other processor that may connect to one or more databases that contain records of all registered devices and/or users connected to the edge device. In response to receiving the verification request from the IoT device 30, the processor 202 can access, for example, a user device database to verify whether there are any devices and/or users that are already connected to the edge device but are not registered in the database of the user device 121. If a mismatch is found, then the processor 202 can send an alert notification to the user device interface. In some embodiments, the processor 202 of the user device 121, for example, may provide a selection for the user to register such unregistered device and/or user in a database record to associate such device and/or user with the edge device. In some embodiments, in response to receiving such instructions from the user, the processor 202 may register such device/user and/or communicatively couple the IoT device 30 and the edge device. Alternatively or optionally, the processor 202, for example, may provide a selection to the user interface for the user to select communicatively decoupling such unregistered device and/or user and the edge device. In some embodiments, alternatively or optionally, in response to receiving such instructions from the user, the processor 202, for example, may also communicatively couple and/or communicatively decouple such device the IoT device 30 and the edge device.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method, comprising:
  receiving, by one or more processors of a user device, a payment request packet from an Internet of Things (IoT) device;
  extracting, by the one or more processors, a signature of the payment request packet that includes metadata;
  identifying, by the one or more processors, a firmware update status from the metadata of the signature;
  determining, by the one or more processors, that the IoT device has a first version of the firmware installed on the IoT device based on the firmware update status;
  causing, by the one or more processors, a second version of the firmware to be installed on the IoT device in response to determining the IoT device has the first version of the firmware; and
  initiating, by the one or more processors, a transaction based on the payment request packet responsive to the second version of the firmware being installed on the IoT device.

2. The method of claim 1, wherein causing the second version of the firmware to be installed comprises:
   retrieving, from a server corresponding to the IoT device, by the one or more processors, the second version of the firmware; and
   transmitting, to the server corresponding to the IoT device, by the one or more processors, the second version of the firmware to cause installing at the IoT device the second version of the firmware.

3. The method of claim 1, wherein causing the second version of the firmware to be installed includes transmitting a signal to the IoT device which causes the second version of the firmware to be downloaded and installed on the IoT device.

4. The method of claim 1, wherein the at least one of the user device and the IoT device is communicatively coupled to an edge device.

5. The method of claim 1, wherein the payment request packet is received via at least one of LTE-M (Long Term Evolution for Machines) and NB-IoT (Narrowband IoT) networks.

6. The method of claim 1, wherein at least one of the signature of the payment request packet and the metadata of the signature further comprises at least one of GPS coordinates to verify location of the IoT device using its GPS coordinates, an Integrated Circuit Card Identification Number (ICCID), or a firmware signature.

7. The method of claim 1, wherein the payment request packet includes an image, which is processed to perform at least one of identifying items for purchase and initiating a purchase transaction of the items for purchase.

8. The method of claim 1, wherein the method further comprises registering the IoT device with one or more databases.

9. The method of claim 8, wherein the registering the IoT device with the one or more databases comprises storing data corresponding to the IoT device in at least one of an IoT manufacturer's database or a database of an enterprise supporting an application on the user device.

10. A device, comprising:
   one or more processors configured to execute instructions to:
      receive a payment request packet from an Internet of Things (IoT) device;
      extract a signature of the payment request packet that includes metadata;
      identify a firmware update status from the metadata of the signature;
      determine that the IoT device has a first version of the firmware installed on the IoT device based on the firmware update status;
      cause a second version of the firmware to be installed on the IoT device in response to determining the IoT device has the first version of the firmware; and
      initiate a transaction based on the payment request packet responsive to the second version of the firmware being installed on the IoT device.

11. The device of claim 10, wherein an instruction to cause the second version of the firmware to be installed comprises instructions to:
   retrieve, from a server corresponding to the IoT device, the second version of the firmware; and
   transmit, to the server corresponding to the IoT device, the second version of the firmware to cause installing at the IoT device the second version of the firmware.

12. The device of claim 10, wherein the device and the IoT device are communicatively coupled to an edge device.

13. The device of claim 10, wherein the payment request packet is received via at least one of LTE-M (Long Term Evolution for Machines) or NB-IoT (Narrowband IoT) networks.

14. The device of claim 10, wherein the one or more processors are configured to execute instructions to register the IoT device with one or more databases.

15. The device of claim 14, wherein to register the IoT device with the one or more databases, the one or more processors are configured to execute instructions to store data corresponding to the IoT device in at least one of an IoT manufacturer database or a database of an enterprise supporting an application on the device.

16. The device of claim 10, wherein at least one of the signature of the payment request packet and the metadata of the signature further comprises at least one of GPS coordinates to verify location of the IoT device using its GPS coordinates, an Integrated Circuit Card Identification Number (ICCID), or a firmware signature.

17. The device of claim 10, wherein the payment request packet includes an image, which is processed to perform at least one of identifying items for purchase or initiating a purchase transaction for the items.

18. A non-transitory computer readable medium storing instructions that, when executed by one or more processors, cause the one or more processors to:
   receive a payment request packet from an Internet of Things (IoT) device;
   extract a signature of the payment request packet that includes metadata;
   identify a firmware update status from the metadata of the signature;
   determine that the IoT device has a first version of the firmware installed on the IoT device based on the firmware update status;
   cause a second version of the firmware to be installed on the IoT device in response to determining the IoT device has the first version of the firmware; and
   initiate a transaction based on the payment request packet responsive to the second version of the firmware being installed on the IoT device.

19. The non-transitory computer readable medium of claim 18, wherein the payment request packet is received via at least one of LTE-M (Long Term Evolution for Machines) or NB-IoT (Narrowband IoT) networks.

20. The non-transitory computer readable medium of claim 18, wherein at least one of the signature of the payment request packet and the metadata of the signature further comprises at least one of GPS coordinates to verify location of the IoT device using its GPS coordinates, an Integrated Circuit Card Identification Number (ICCID), or a firmware signature.

* * * * *